US006543351B2

(12) United States Patent
Förch

(10) Patent No.: US 6,543,351 B2
(45) Date of Patent: Apr. 8, 2003

(54) ABSORBER FOR DAMPING VIBRATIONS OF A ROTATING COMPONENT, IN PARTICULAR IN A ROTARY PRINTING MACHINE

(75) Inventor: Peter Förch, Neustadt (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/859,794

(22) Filed: May 17, 2001

(65) Prior Publication Data
US 2001/0042466 A1 Nov. 22, 2001

(30) Foreign Application Priority Data
May 17, 2000 (DE) ......................... 100 23 927

(51) Int. Cl.[7] ................................ B41F 13/08
(52) U.S. Cl. .................. 101/216; 74/574; 384/461; 464/66
(58) Field of Search .................. 101/216; 74/574, 74/572, 573 R; 384/461; 464/66, 67, 68

(56) References Cited
U.S. PATENT DOCUMENTS

| 4,183,267 A | * | 1/1980 | Jackson | 475/162 |
| 4,561,532 A | * | 12/1985 | Knodel | 192/110 B |
| 4,729,464 A | * | 3/1988 | Friedmann | 192/110 B |
| 4,732,250 A | * | 3/1988 | Maucher et al. | 192/70.17 |
| 6,314,826 B1 | * | 11/2001 | Cunningham et al. | 475/168 |

FOREIGN PATENT DOCUMENTS

| DE | 19904806 A1 | 8/2000 |
| EP | 0 647 796 A1 | 4/1995 |

* cited by examiner

Primary Examiner—Andrew H. Hirshfeld
Assistant Examiner—Jill E. Culler
(74) Attorney, Agent, or Firm—Laurence A. Greenberg; Werner H. Stemer; Ralph E. Locher

(57) ABSTRACT

An absorber for damping vibrations in a rotating component includes a primary part connectable to the rotating component so as to be fixed against rotation relative thereto; an absorber mass; the primary part and the absorber mass being couplable to one another via a damping and spring coupling so that the absorber mass is rotatable to a limited extent relative to the primary part; at least two antifriction bearings for mounting the absorber mass on the rotating component; the two antifriction bearings being nested within one another, so that one of the antifriction bearings is seated on a larger radius than the other; and an intermediate ring disposed in a radial direction between the two antifriction bearings.

7 Claims, 3 Drawing Sheets

ABSORBER FOR DAMPING VIBRATIONS OF A ROTATING COMPONENT, IN PARTICULAR IN A ROTARY PRINTING MACHINE

BACKGROUND OF THE INVENTION

FIELD OF THE INVENTION

The invention relates to an absorber for damping vibrations of a rotating component, in particular a cylinder or a roller of a rotary printing machine.

Vibration absorbers or dampers of this type have become known heretofore from a large number of publications. Such vibration absorbers or dampers are used, for example, in the drive train of internal combustion engines. In this context, what is understood by the designation "absorber" is a device which only damps torsional vibrations in a component, without transmitting torque to another component.

The purpose of such vibration absorbers is to reduce torsional stresses in rotating components, in order to prevent damage to the components. Furthermore, in printing machines, absorbers also serve for preventing vibrations which influence the entire system and are detrimental to the quality of the printing result.

Vibration absorbers are known from the prior art which have elastic media as a damping and spring coupling member, for example, a spring ring made of rubber (note the published European Patent Document EP 0 647 796 A1). The vibration absorber described therein includes an inertia ring which has at least one spring ring made of rubber that is fixed relatively rotatably in a shaft and comes into direct bearing contact with the outer circumference of the shaft and is pressed nonrotatably onto the shaft by the inertia ring. Other types of damping and spring coupling members are also known.

In those absorbers which are used in printing machines, the following applies: the torsional inertia and torsional rigidity of the absorber are coordinated with one another in such a way that the characteristic frequency of the absorber corresponds to the characteristic frequency of the printing machine. The angular velocity of the rotational mass of the absorber is equal to the angular velocity of the rotating component, generally the impression cylinder. Under corresponding excitation, the characteristic vibration of the absorber mass is superposed on the rotational movement of the absorber mass. Relative rotation occurs, in this regard, between the absorber mass and the cylinder. This amounts to a maximum of 1° during operation.

In a heretofore known construction, the absorber mass is mounted on the component by a roller bearing. It was shown, in this regard, that the useful life of such bearings may be relatively short. Attempts were made to solve the problem of lengthening the useful life by a choice of stronger bearings, but this has proven to be unsuccessful.

SUMMARY OF THE INVENTION

It is accordingly an object of the invention to provide an absorber of the type described in the introduction hereto, with a roller bearing between the absorber mass and the rotating component, which is of such construction that the useful life of the bearing is markedly longer than in conventional embodiments.

With the foregoing and other objects in view, there is provided, in accordance with the invention, an absorber for damping vibrations in a rotating component, comprising a primary part connectable to the rotating component so as to be fixed against rotation relative thereto; an absorber mass; the primary part and the absorber mass being couplable to one another via a damping and spring coupling so that the absorber mass is rotatable to a limited extent relative to the primary part; at least two antifriction bearings for mounting the absorber mass on the rotating component; the two antifriction bearings being nested within one another, so that one of the antifriction bearings is seated on a larger radius than the other; and an intermediate ring disposed in a radial direction between the two antifriction bearings.

In accordance with another feature of the invention, the rotating component is a cylinder of a rotary printing machine.

In accordance with a further feature of the invention, the intermediate ring forms an outer running surface of an inner bearing of the antifriction bearings, and an inner running surface of an outer bearing of the antifriction bearings.

In accordance with an added feature of the invention, the intermediate ring is connected to an outer race of the inner bearing and to an inner race of the outer bearing so as to be fixed against rotation relative thereto.

In accordance with an additional feature of the invention, the inner and the outer bearings constitute a first bearing pair, and including, axially adjacent the first bearing pair, a second bearing pair having bearings likewise nested within one another; and an intermediate ring also disposed between the bearings of the second bearing pair.

In accordance with yet another feature of the invention, the intermediate ring of one of the two bearing pairs is connected via a holder to fixed surroundings so as to be fixed against rotation relative to the fixed surroundings, and a web is included for connecting both of the intermediate rings to one another so that the intermediate rings are fixed against rotation relative to one another.

In accordance with a concomitant feature of the invention, the intermediate rings are formed as a single intermediate ring assigned to both of the bearing pairs.

The applicant-inventor has recognized the following: The relative rotation between the inner ring and the outer ring of the bearing is minimal. The rolling bodies, such as balls, rollers or needles, of the bearing execute virtually no rolling movement. They therefore dwell virtually at one and the same point. It is consequently always the same points on the running surfaces of the bearing which are subjected to stress, so that "potholes" of a kind are formed. Moreover, the rolling bodies are permanently subjected to a load which acts in a single direction and on a single region, thus leading to premature failure of the bearing.

By virtue of the arrangement according to the invention, with two bearings nested one within the other and with a common intermediate ring secured against rotation, rotation of the rolling bodies occurs.

The principle according to the invention can be implemented very simply and without a high cost outlay and integrated into the vibration absorber. It can also be implemented as a fixed/loose or movable bearing.

Other features which are considered as characteristic for the invention are set forth in the appended claims.

Although the invention is illustrated and described herein as embodied in an absorber for damping vibrations in a rotating component, in particular in a rotary printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
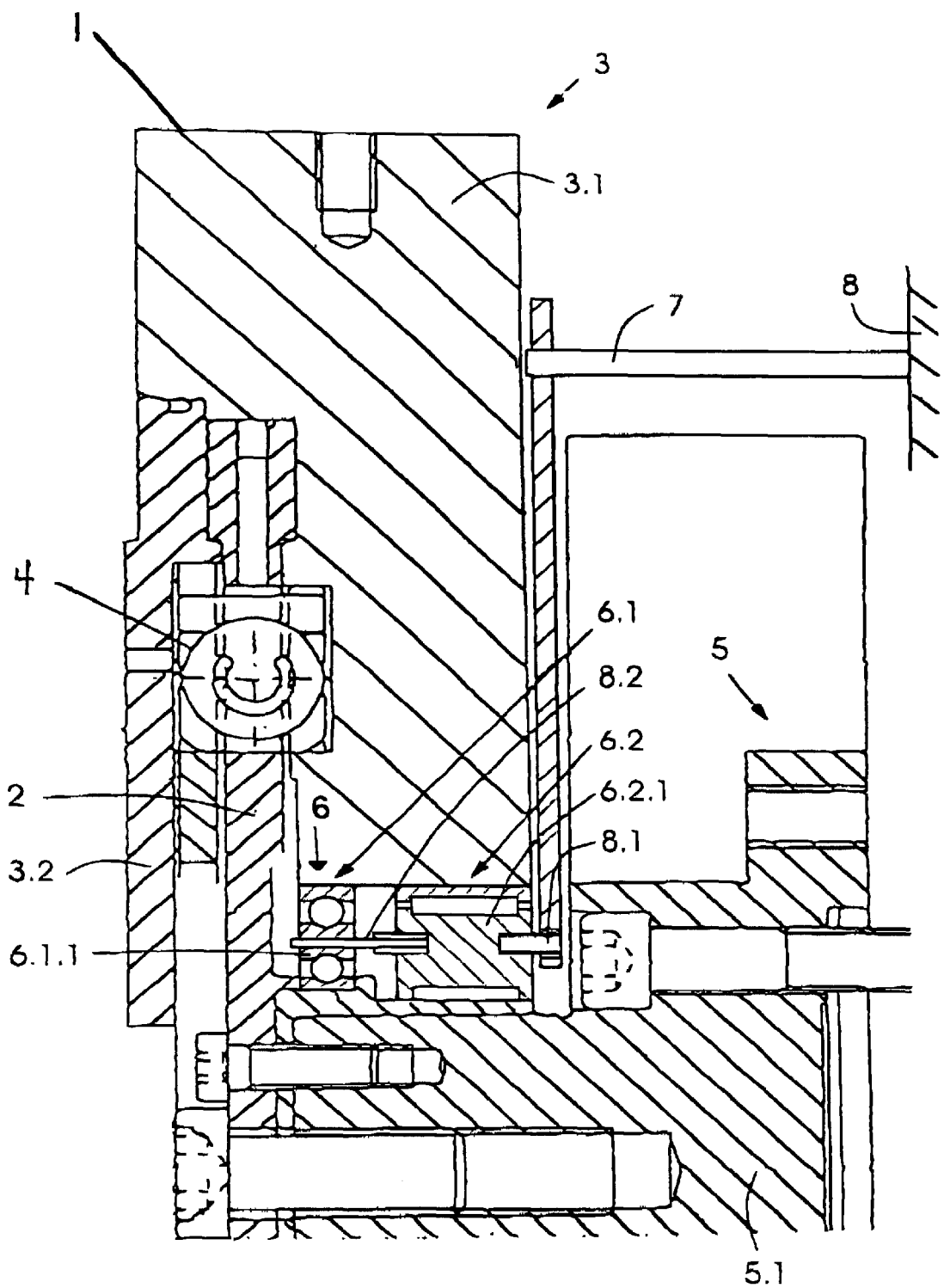
FIG. 1 is a fragmentary axial sectional view of a first embodiment of an absorber according to the invention.

Referring now to the drawings and, first, particularly to FIG. 1 thereof, there is shown therein an absorber 1 including a primary part 2 and an absorber mass 3. A damping and spring coupling 4 is inserted between the primary part 2 and the absorber mass 3 so that these two parts are coupled to one another and, at the same time, can execute a slight rotation relative to one another.

A bearing journal for a shaft 5.1 of a rotating component 5 in the form of an impression cylinder is shown in FIG. 1.

The absorber mass 3 is mounted on the shaft 5.1 of the impression cylinder 5 by an antifriction bearing support 6. As is apparent, the bearing support is made up of a first pair of bearings 6.1 and a second pair of bearings 6.2.

The pair of bearings 6.1 is composed of two joint ball bearings which are nested one within the other. One of the two bearings is thus located radially within the other. A race 6.1.1 is common to both bearings. This forms the outer running surface of the balls of the radially inner bearing and, at the same time, the inner running surface for the balls of the radially outer bearing.

The second bearing 6.2 is a needle bearing. Here, too, two rings of needles are again provided, namely a radially inner and a radially outer ring. Here, too, a race 6.2.1 is again provided, which forms running surfaces for the two rings of needles.

According to the invention, furthermore, a holder 7 is provided. This, on the one hand, is secured to fixed surroundings, in the case at hand, to a side wall 8 of the printing machine and, on the other hand, engages with a pin or tenon 8.1 extending into the race 6.2.1 of the bearing 6.2. The race 6.2.1 is thus secured against rotation.

The race 6.1.1 of the first pair of bearings 6.1, and the race 6.2.1 of the second pair of bearings 6.2 are also firmly connected to one another by a pin 8.2, so that the race 6.1.1 of the first pair of bearings 6.1 is also secured against rotation.

Figure 2:
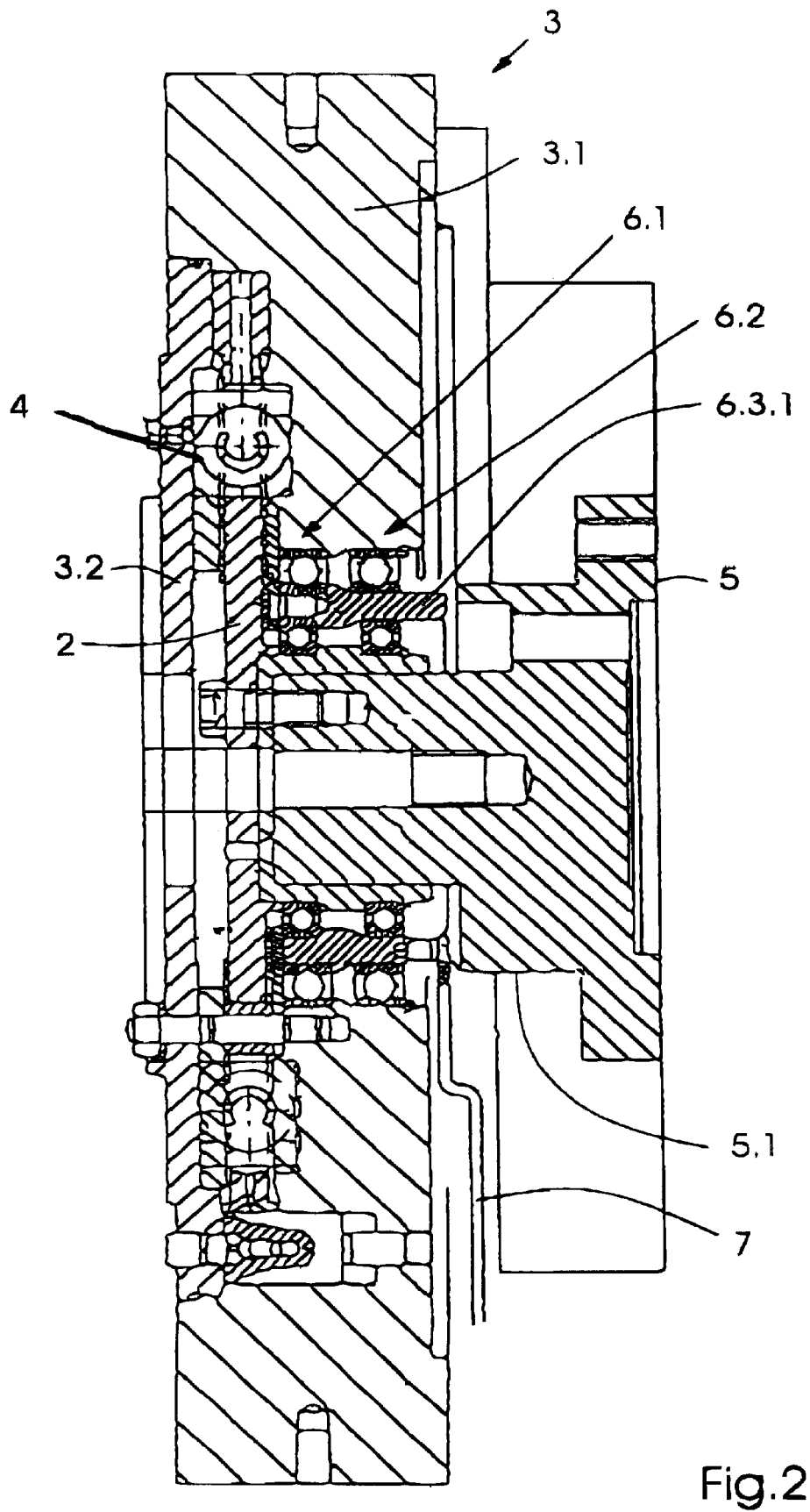
FIG. 2 is a view like that of FIG. 1, reduced and modified to show a second embodiment of the absorber.

The second embodiment shown in FIG. 2, in principle, is constructed in the same manner as the first embodiment of FIG. 1. It differs from the first embodiment in the type of bearing support.

Here, also, two pairs of antifriction bearings 6.1 and 6.2 are again provided. In this case, however, all the bearings of these two pairs of antifriction bearings are ball bearings. They may be constructed and dimensioned identically. However, this is not absolutely necessary.

An intermediate ring 6.3.1 can be seen between the two bearings of each pair of bearings 6.1 and 6.2. The intermediate ring 6.3.1 does not serve, in this case, as a running surface for the bearings, but rather, carries these bearings, specifically in the following manner: the inner races of the outer bearings and the outer races of the inner bearings are secured to the intermediate ring 6.3.1 by a press fit so that the bearing rings cannot rotate. This results in a rolling of the balls of the bearings.

The intermediate ring 6.3.1, in turn, is secured to the external surroundings by a holder 7.

In both cases, the absorber mass 3 has a main part 3.1 and an annular plate 3.2. In this illustration, these two parts surround the primary part 2 in an approximately U-shaped manner. The division into the main part 3.1 and the annular plate 3.2 is necessary for reasons of assembly.

How the spring and damping device is supported between the primary part 2 and the absorber mass 3 may be apparent, for example, from either of the German Patents 36 35 043 and 39 16 575.

In the case at hand, the main part 3.1 and the annular plate 3.2 of the absorber mass 3 have window-like cutouts which are complementary to clearances on the primary part 2 which themselves receive the damping and spring coupling. The two parts 3.1 and 3.2 engage at both sides tangentially on the damping and spring coupling.

Should longitudinal and/or torsional vibrations occur on the shaft journal, these vibrations are introduced into the primary part 2 via the rotationally fixed coupling of the primary part 2 to the shaft journal. Under the effect of a torsional moment when the rotating component 5, here the impression cylinder, is in operation, a compression of the springs then occurs and, therewith, relative movement between the primary part 2 and the absorber mass 3, thus leading to the adjustment or setting of a particular angle of rotation; in this regard, the vibrations are compensated for by the absorber mass 3.

Appropriate devices are provided for damping the relative movement between the primary part 2 and the absorber mass 3. In the illustrated embodiment, damping takes place via an hydraulic fluid.

Figure 3:
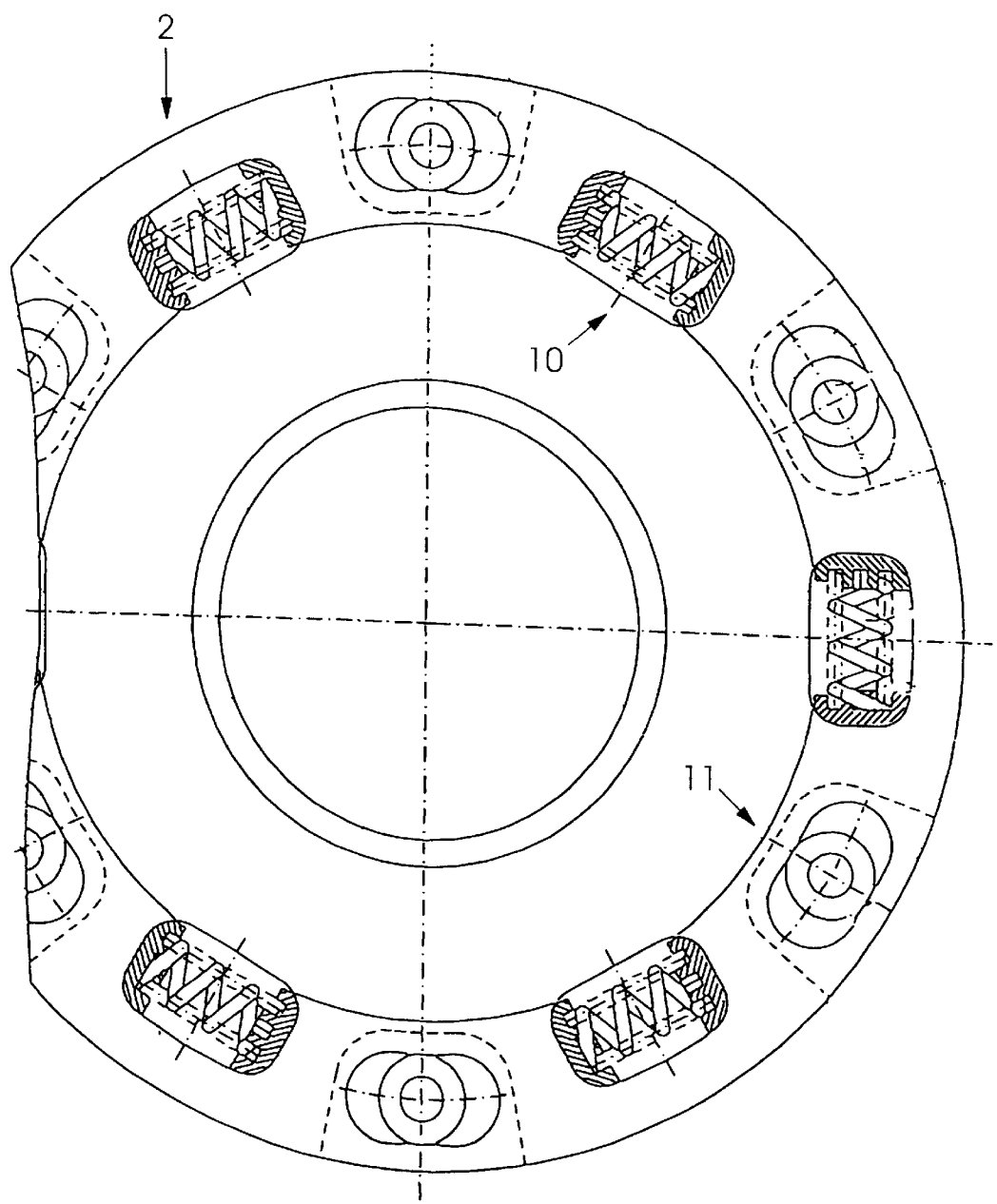
FIG. 3 is a fragmentary top plan view, partly in section, of a primary part of FIG. 1.

FIG. 3 shows the situation more closely. Springs 10 and damping devices 11 can be seen therein. The details do not have to be dealt with any further, because they are known from the prior art.

I claim:

1. An absorber for damping vibrations in a rotating component, comprising a primary part connectable to the rotating component so as to be fixed against rotation relative thereto; an absorber mass; said primary part and said absorber mass being couplable to one another via a coupling having spring and damping elements so that said absorber mass is rotatable to a limited extent relative to said primary part; at least two antifriction bearings for mounting said absorber mass on the rotating component; said two antifriction bearings being nested within one another, so that one of said antifriction bearings is seated on a larger radius than the other; an intermediate ring disposed in a radial direction between said two antifriction bearings, and a holder connecting said intermediate ring to fixed surroundings for fixation of said intermediate ring against rotation relative to the fixed surroundings.

2. The absorber according to claim 1, wherein the rotating component is a cylinder of a rotary printing machine.

3. The absorber according to claim 1, wherein said intermediate ring forms an outer running surface of an inner bearing of said antifriction bearings, and an inner running surface of an outer bearing of said antifriction bearings.

4. The absorber according to claim 3, wherein said inner and said outer bearings constitute a first bearing pair, and including, axially adjacent said first bearing pair, a second bearing pair having bearings likewise nested within one another; and an intermediate ring also disposed between said bearings of said second bearing pair.

5. An absorber for damping vibrations in a rotating component, comprising a primary part connectable to the rotating component so as to be fixed against rotation relative thereto; an absorber mass; said primary part and said absorber mass being couplable to one another via a coupling having spring and damping elements so that said absorber mass is rotatable to a limited extent relative to said primary part; at least two antifriction bearings for mounting said absorber mass on the rotating component; said two antifriction bearings being nested within one another, so that one of said antifriction bearings is seated on a larger radius than the other; and an intermediate ring disposed in a radial direction between said two antifriction bearings, said intermediate ring forming an outer running surface of an inner bearing of said antifriction bearings, and an inner running surface of an outer bearing of said antifriction bearings, and said intermediate ring being connected to an outer race of said inner bearing and to an inner race of said outer bearing so as to be fixed against rotation relative thereto.

6. An absorber for damping vibrations in a rotating component, comprising a primary part connectable to the rotating component so as to be fixed against rotation relative thereto; an absorber mass; said primary part and said absorber mass being couplable to one another via a coupling having spring and damping elements so that said absorber mass is rotatable to a limited extent relative to said primary part; at least two antifriction bearings for mounting said absorber mass on the rotating component; said two antifriction bearings being nested within one another, so that one of said antifriction bearings is seated on a larger radius than the other; an intermediate ring disposed in a radial direction between said two antifriction bearings, said intermediate ring forming an outer running surface of an inner bearing of said antifriction bearings, and an inner running surface of an outer bearing of said antifriction bearings; said inner and said outer bearings constituting a first bearing pair; a second bearing pair axially adjacent said first bearing pair and having bearings likewise nested within one another; an intermediate ring disposed between said bearings of said second bearing pair; a holder connecting said intermediate ring of one of said two bearing pairs to fixed surroundings so as to be fixed against rotation relative to the fixed surroundings; and a web for connecting both of said intermediate rings to one another for fixing said intermediate rings against rotation relative to one another.

7. An absorber for damping vibrations in a rotating component, comprising a primary part connectable to the rotating component so as to be fixed against rotation relative thereto; an absorber mass; said primary part and said absorber mass being couplable to one another via a coupling having spring and damping elements so that said absorber mass is rotatable to a limited extent relative to said primary part; at least two antifriction bearings for mounting said absorber mass on the rotating component; said two antifriction bearings being nested within one another, so that one of said antifriction bearings is seated on a larger radius than the other; an intermediate ring disposed in a radial direction between said two antifriction bearings, said intermediate ring forming an outer running surface of an inner bearing of said antifriction bearings, and an inner running surface of an outer bearing of said antifriction bearings; said inner and said outer bearings constituting a first bearing pair; a second bearing pair axially adjacent said first bearing pair and having bearings likewise nested within one another; and an intermediate ring disposed between said bearings of said second bearing pair, said intermediate rings being formed as a single intermediate ring assigned to both of said bearing pairs.

* * * * *